US010363530B2

(12) United States Patent
Kolar et al.

(10) Patent No.: US 10,363,530 B2
(45) Date of Patent: Jul. 30, 2019

(54) WIRELESS BLENDING DEVICE AND SYSTEM

(71) Applicant: VITA-MIX MANAGEMENT CORPORATION, Olmsted Township, OH (US)

(72) Inventors: David Kolar, Stow, OH (US); Paul G. Sems, Strongsville, OH (US)

(73) Assignee: VITA-MIX MANAGEMENT CORPORATION, Olmsted Township, OH (US)

( * ) Notice: Subject to any disclaimer, the term of this patent is extended or adjusted under 35 U.S.C. 154(b) by 0 days.

(21) Appl. No.: 15/095,221

(22) Filed: Apr. 11, 2016

(65) Prior Publication Data
US 2016/0220973 A1 Aug. 4, 2016

Related U.S. Application Data

(63) Continuation of application No. 14/213,921, filed on Mar. 14, 2014.
(Continued)

(51) Int. Cl.
*A47J 43/00* (2006.01)
*B01F 15/00* (2006.01)
(Continued)

(52) U.S. Cl.
CPC ....... B01F 15/00305 (2013.01); *A47J 43/042* (2013.01); *A47J 43/07* (2013.01);
(Continued)

(58) Field of Classification Search
CPC ...... A47J 43/044; A47J 43/046; A47J 43/042; A47J 43/07; A47J 43/08; A47J 43/085;
(Continued)

(56) References Cited

U.S. PATENT DOCUMENTS 2,955,186 A 10/1960 Ritter
3,299,226 A 1/1967 Edwards
(Continued)

FOREIGN PATENT DOCUMENTS

CN 101194807 6/2008
CN 101449625 6/2009
(Continued)

OTHER PUBLICATIONS

Copenheaver, Blaine, International Search Report and Written Opinion, PCT/US2014/029134, dated Aug. 1, 2014, International Search Authority/USA.
(Continued)

*Primary Examiner* — Anshu Bhatia
(74) *Attorney, Agent, or Firm* — McDonald Hopkins LLC

(57) ABSTRACT

A blending device includes a motor, a motor controller, and a wireless controller configured to receive a wireless signal. The motor controller may be configured to alter the operations of the motor based the wireless signal. The wireless signal may include a blending program to be carried out by the blending device. The blending device may include one or more sensors configured to sense parameters of the blending device. The wireless signal may include information related to the sensed parameters. A blending device network may be formed by providing a second blending device having a wireless controller in communication with the first blending device wireless controller. The first and second blending devices may share information over the network.

16 Claims, 5 Drawing Sheets

Related U.S. Application Data

(60) Provisional application No. 61/789,679, filed on Mar. 15, 2013.

(51) Int. Cl.

| | | |
|---|---|---|
| *H04W 4/80* | (2018.01) | |
| *A47J 43/042* | (2006.01) | |
| *A47J 43/07* | (2006.01) | |
| *A47J 43/08* | (2006.01) | |
| *H04L 12/28* | (2006.01) | |
| *G08C 17/02* | (2006.01) | |
| *G05B 15/02* | (2006.01) | |

(52) U.S. Cl.
CPC ............ *A47J 43/08* (2013.01); *A47J 43/085* (2013.01); *B01F 15/00201* (2013.01); *B01F 15/00253* (2013.01); *B01F 15/00311* (2013.01); *B01F 15/00389* (2013.01); *G05B 15/02* (2013.01); *G08C 17/02* (2013.01); *H04L 12/281* (2013.01); *H04L 12/282* (2013.01); *H04W 4/80* (2018.02)

(58) Field of Classification Search
CPC ......... B01F 15/00305; B01F 15/00201; B01F 15/00253; B01F 15/00311; B01F 15/00389; H04W 4/80; G05B 15/02; G08C 17/02; H04L 12/281; H04L 12/282
USPC ...................................................... 366/205
See application file for complete search history.

(56) References Cited

U.S. PATENT DOCUMENTS

| | | |
|---|---|---|
| 3,548,280 A | 12/1970 | Cockroft |
| 3,731,059 A | 5/1973 | Wilson |
| 3,943,421 A | 3/1976 | Shibata et al. |
| 3,951,351 A | 4/1976 | Ernster et al. |
| 4,568,193 A | 2/1986 | Conti et al. |
| 4,686,356 A | 8/1987 | Ueda et al. |
| 4,762,057 A | 8/1988 | Hirota et al. |
| 4,822,172 A | 4/1989 | Stottmann |
| 4,893,942 A | 1/1990 | Stottmann |
| 4,968,864 A | 11/1990 | Doi et al. |
| 5,156,867 A | 10/1992 | Leuthold et al. |
| 5,267,211 A | 11/1993 | Kobayashi et al. |
| 5,267,790 A | 12/1993 | Sutherland et al. |
| 5,316,382 A | 5/1994 | Penaranda et al. |
| 5,347,205 A | 9/1994 | Piland |
| 5,363,746 A | 11/1994 | Gordon |
| 5,392,695 A | 2/1995 | Junkel |
| 5,531,153 A | 7/1996 | Maruyama et al. |
| 5,556,198 A | 9/1996 | Dickson, Jr. et al. |
| 5,562,020 A | 10/1996 | Shigeshiro |
| 5,577,735 A | 11/1996 | Reed et al. |
| 5,605,090 A * | 2/1997 | Mantani ............... A21B 7/005 366/146 |
| 5,660,467 A | 8/1997 | Mineo et al. |
| 5,768,978 A | 6/1998 | Dorner et al. |
| 5,829,341 A | 11/1998 | Lin |
| 5,839,356 A | 11/1998 | Dornbush et al. |
| 5,967,021 A | 10/1999 | Yung |
| 6,210,033 B1 | 4/2001 | Karkos, Jr. et al. |
| 6,364,522 B2 | 4/2002 | Kolar et al. |
| 6,402,365 B1 | 6/2002 | Wong |
| 6,609,821 B2 | 8/2003 | Wulf et al. |
| 6,959,562 B2 | 11/2005 | Navedo et al. |
| 7,422,362 B2 | 9/2008 | Sands |
| 2002/0009017 A1 | 1/2002 | Kolar et al. |
| 2002/0027175 A1 | 3/2002 | Capp |
| 2002/0176320 A1 | 11/2002 | Wulf et al. |
| 2004/0203387 A1 | 10/2004 | Grannan |
| 2005/0229795 A1 | 10/2005 | Stuckey |
| 2006/0086843 A1 | 4/2006 | Lin et al. |
| 2006/0169715 A1 | 8/2006 | Emmendorfer et al. |
| 2006/0203610 A1 | 9/2006 | Bohannon, Jr. et al. |
| 2006/0214765 A1 | 9/2006 | Pitchers et al. |
| 2007/0221668 A1 | 9/2007 | Baarman et al. |
| 2008/0217999 A1* | 9/2008 | Baarman ............... H05B 6/062 307/104 |
| 2011/0189358 A1 | 8/2011 | Herbert |
| 2011/0199852 A1 | 8/2011 | Martin |
| 2011/0248108 A1* | 10/2011 | Carriere ............ A47J 43/0722 366/205 |
| 2012/0023212 A1* | 1/2012 | Roth .................. H04L 12/282 709/223 |
| 2012/0286080 A1* | 11/2012 | Sladecek ............ A47J 27/004 241/65 |

FOREIGN PATENT DOCUMENTS

| | | |
|---|---|---|
| EP | 1561409 | 2/2005 |
| WO | 2003094679 | 11/2003 |
| WO | 2006104651 | 10/2006 |
| WO | M06104651 | 10/2006 |
| WO | 2006124051 | 11/2006 |
| WO | 2008112066 | 9/2008 |
| WO | 2014056785 | 4/2014 |

OTHER PUBLICATIONS

Young, Lee W., International Search Report and Written Opinion, PCT/US2014/029384, dated Aug. 11, 2014, International Search Authority/USA.
Gaggia Espanola, S.A., ipanerma, brochure, undated.
Gaggia Espanola, S.A., Copacabana, brochure, undated.
Gaggia Espanola, S.A., ipanema Space-Saving High Technology, brochure, undated.

* cited by examiner

WIRELESS BLENDING DEVICE AND SYSTEM

CROSS-REFERENCE TO RELATED APPLICATIONS

This application is a continuation of co-pending U.S. patent application Ser. No. 14/213,921 entitled "WIRELESS BLENDING DEVICE AND SYSTEM," filed on Mar. 14, 2014, which claims priority to U.S. Provisional Patent Application No. 61/789,679 entitled "WIRELESS BLENDING DEVICE AND SYSTEM," filed on Mar. 15, 2013, each of which is incorporated herein by reference in its entirety.

TECHNICAL FIELD

The present invention relates to a wireless blending device and system capable of receiving and sending information to another wireless device, such as another blender, cellular devices, computer devices, and web-applications.

BACKGROUND

Blenders to facilitate the processing of food, drinks, and other blended food preparations, have become ubiquitous in both commercial and residential settings. Such appliances are particularly useful where there are a variety of operations to be performed repeatedly with accuracy and precision.

Because changes in user taste or preference occur, the ability to create and store customized blending sequences provided by the blender has come about. A blending sequence is the unique manner in which a user may increase and/or decrease the speed of the motor, as well as the adjustment of any other user adjustable features provided by the blender over time or with regard to any other suitable parameter. Typically, modification or addition of new blending sequences required that the blender be physically returned to the manufacturer where it was disassembled and reprogrammed. This process resulted in a tremendous inconvenience to users, thus making such blenders unattractive to potential buyers.

Furthermore, as blender technology has progressed, user selectable motor speed controls and timers have been incorporated into blenders to obtain greater consistency between each blended preparation. However, even with such controls, the primary obstacle in receiving and sharing data to consistently create blended preparations, such as blended drinks, still remain and the user is required to adjust the motor speed consistently each time a blending sequence is performed or input data using a cumbersome wire data transfer.

Recently, advances in semiconductor memories have made it feasible for blenders to include memories in which the varying motor speed and operating intervals of the blender required for making a blended preparation may be stored. Typically, these programmable blenders read information regarding a blending sequence that has been encoded by an external programming device onto a magnetic strip adhered to a plastic card. As such, these devices require an external device such as a computer to enter, modify or duplicate the drink programs maintained by the plastic card. However, the component costs necessitated by such a system often make a blender incorporating such features extremely expensive. Furthermore, keeping track of the various program cards used with such a system is generally tedious, as the cards are easily misplaced.

SUMMARY

A blending device is generally provided. The blending device includes a motor, a motor controller, and a wireless controller configured to receive a wireless signal. The motor controller may be configured to alter the operations of the motor based the wireless signal.

The wireless controller may include a memory, a processor, and a wireless control module. The wireless signal may be any wireless signal, such as a Wi-Fi signal, Bluetooth signal, ZigBee signal, or cellular network signal. The wireless controller may be integrally formed with the blending device or may be removably connectable to the blending device through a communication port.

In an embodiment, the wireless controller is configured to receive a blending program. The blending program may comprise at least one motor speed and at least one time interval for the given motor speed. The blending program may further include a ramp or ramp up speed that defines the amount of time the motor takes to reach its predetermined motor speed. The program may be stored on a memory and recalled by the blending device.

In an embodiment, a blending device includes a motor and one or more sensors configured to sense parameters of the blending device. The blending device further includes a wireless controller configured to send a wireless signal related to one or more of the sensed parameters. The sensed parameters may include temperature, cycle time, cycle count, or other parameters.

In an embodiment, a second blending device may include a wireless controller and be configured to interface with the first blending device through its wireless controller. The first and second blending devices may sense parameters, such as temperature, and compare the parameters to determine which blending device is best suited for use.

DETAILED DESCRIPTION

Figure 1:
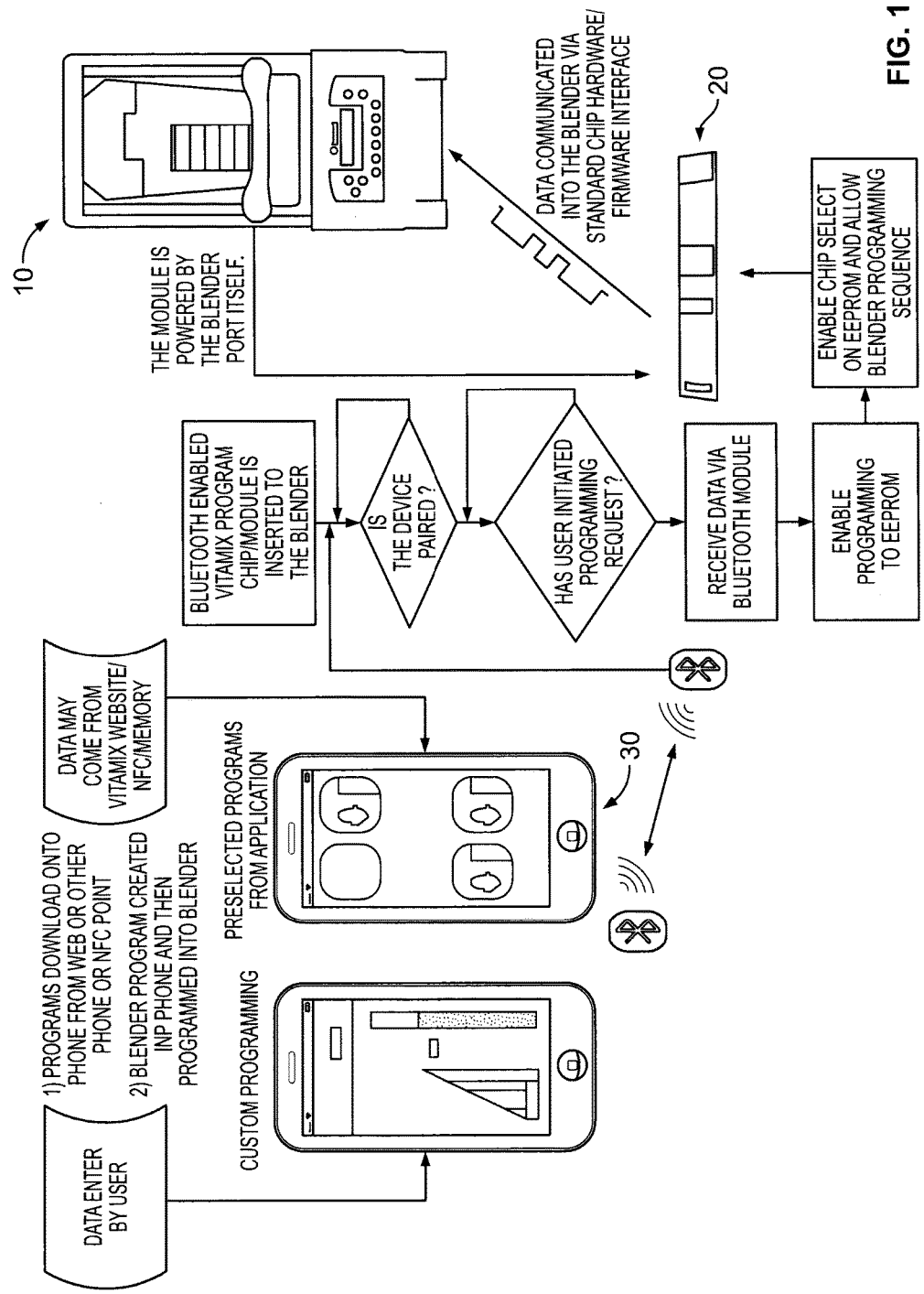
FIG. 1 illustrates a wireless blending device and system in accordance with an embodiment of the present.
Figure 3:
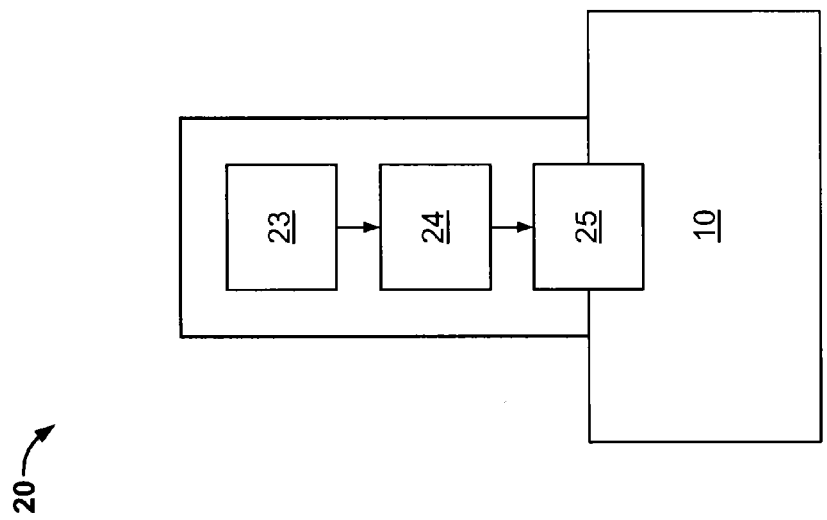
FIG. 3 illustrates a wireless communication system in accordance with an embodiment of the present invention.
Figure 2:
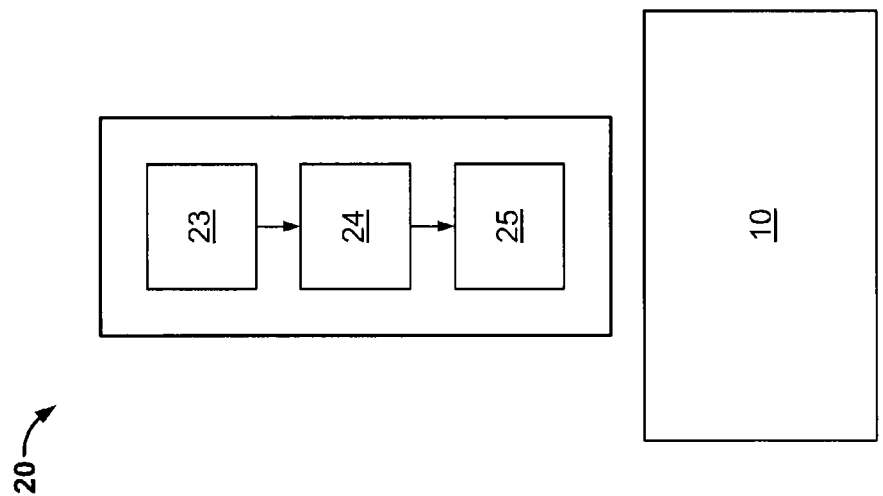
FIG. 2 illustrates a wireless communication system in accordance with an embodiment of the present invention.
Figure 4:
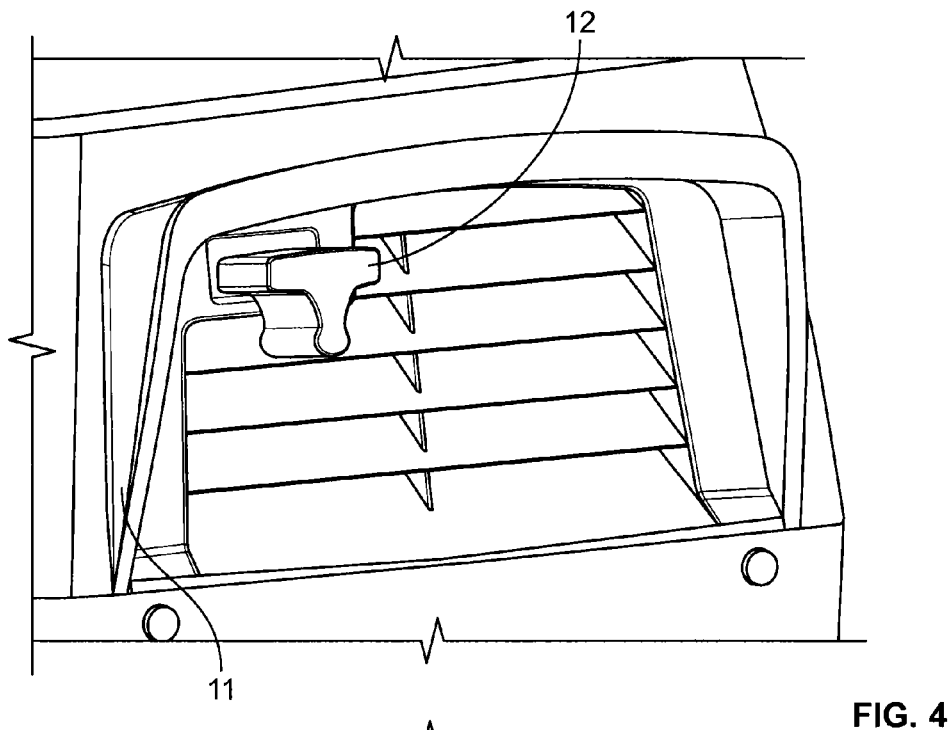
FIG. 4 illustrates a perspective view of a blending device including a dongle in accordance with an embodiment of the present invention.
Figure 5:
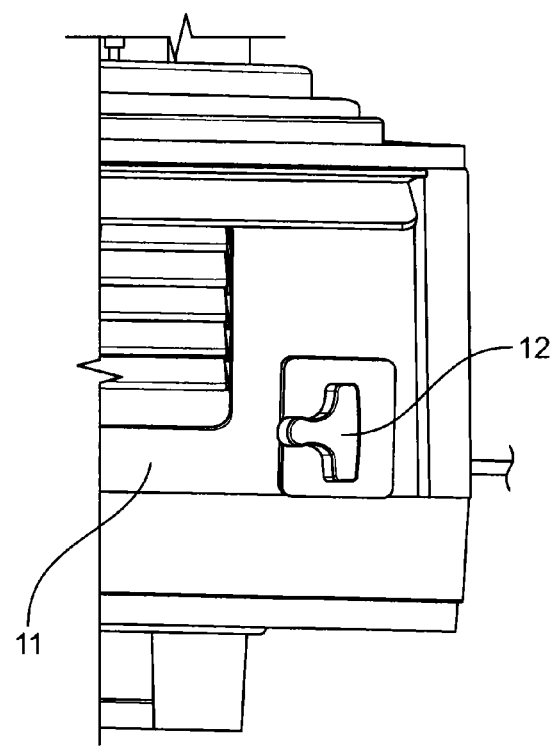
FIG. 5 illustrates a perspective view of a blending device including a dongle in accordance with an embodiment of the present invention.
Figure 6:
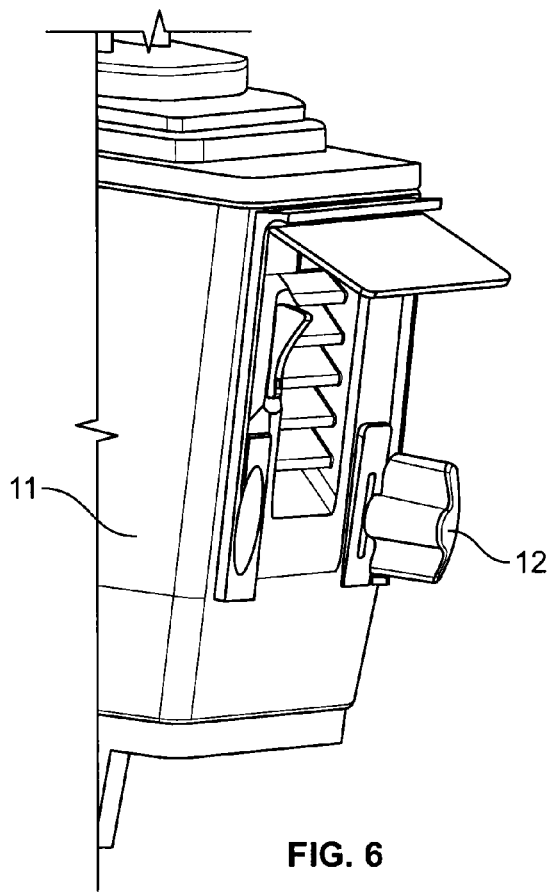
FIG. 6 illustrates a perspective view of a blending device including a dongle in accordance with an embodiment of the present invention.
Figure 7:
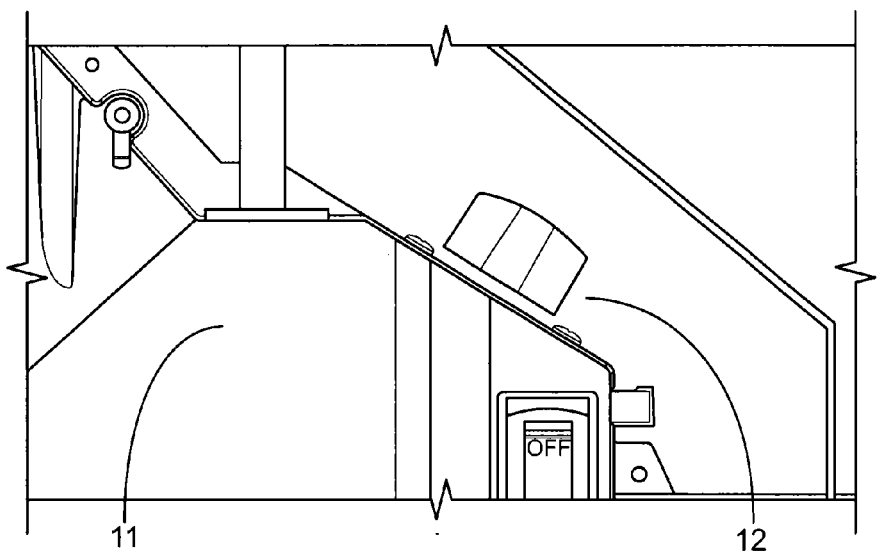
FIG. 7 illustrates a perspective view of a blending device including a dongle in accordance with an embodiment of the present invention.
Figure 8:
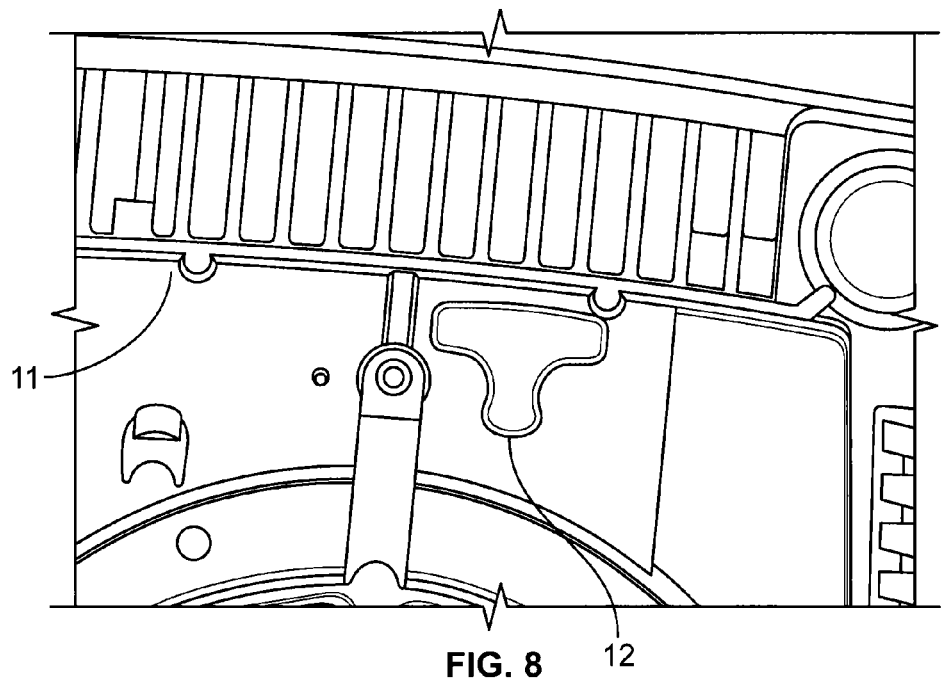
FIG. 8 illustrates a perspective view of a blending device including a dongle in accordance with an embodiment of the present invention.
Figure 9:
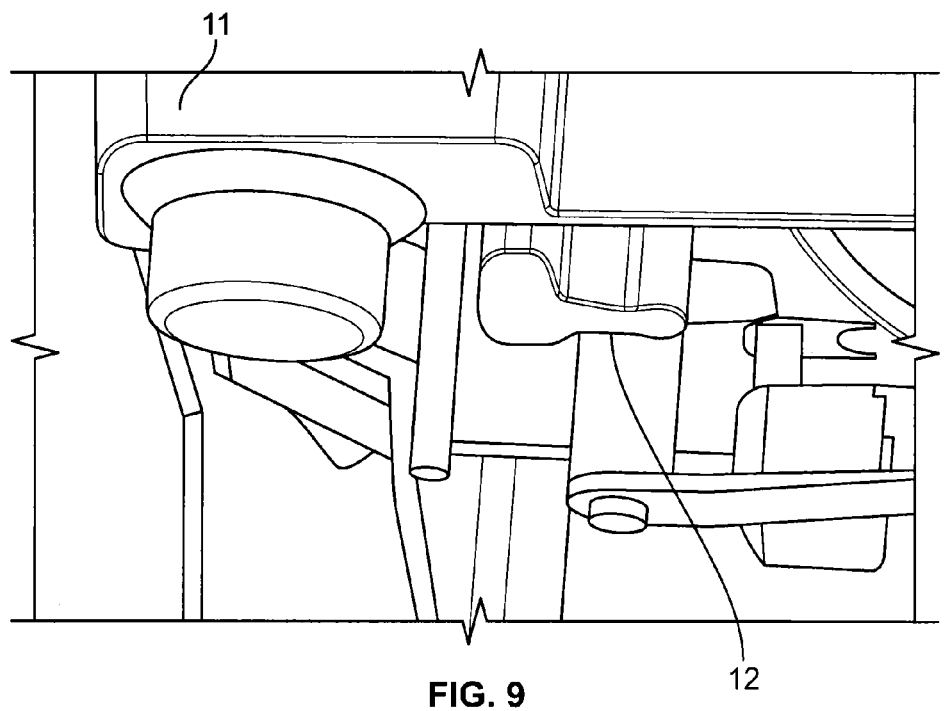
FIG. 9 illustrates a perspective view of a blending device including a dongle in accordance with an embodiment of the present invention.

Reference will now be made in detail to exemplary embodiments, examples of which are illustrated in the accompanying drawings. It is to be understood that other embodiments may be utilized and structural and functional changes may be made. Moreover, features of the various embodiments may be combined or altered. As such, the following description is presented by way of illustration only and should not limit in any way the various alternatives and modifications that may be made to the illustrated embodiments.

A blending device 10 is generally provided. The blending device 10 may include various components, such as a housing, motor, controller, a blending container having a blender blade, and other components as further described below. The housing and structural components of the blending device 10 may be made of any appropriate material, such as suitable plastic materials, metals, ceramics, or a combination thereof.

The blending device 10 may be programmable, as described in U.S. Pat. No. 6,364,522 titled "BLENDER HAVING USER OPERATED DRINK PROGRAM MODIFYING AND COPYING PROCESSOR" and filed on Jun. 18, 2001, which is incorporated by reference in its entirety. The blending device 10 may be programmable to receive and store information. For example, the blending device 10 may include a memory 25 for storing a blend program or other data or parameters. The memory 25 may be integrated with the blending device 10 or removably connected to the blending device 10. The blending device 10 may further include a processor for interfacing with the memory 25 and controlling a blender motor and other blender components and functions.

The memory 25 may be configured to store instructions related to use or operation of the blending device 10. For example, the memory 25 may store a blending program. The program may comprise a series or sequence of blender settings and operations to be carried out by the blending device. For example, a blender program may comprise a series of blender motor speeds to operate the blender blade at the given speed, a series time intervals corresponding to the given motor speeds, and other blender parameters and timing settings. The blending program may further include a ramp that defines the amount of time it takes or the rate at which the motor gets up to the predetermined motor speed.

The memory 25 may be configured to collect and store use and performance data. For example, the memory 25 may store data from sensors or other devices on the blender, such as temperature readings from thermistors or other temperature sensors on the motor coil or at other locations. The memory 25 may further be configured to receive other information such as cycle times, cycle counts, or other blending or sensing parameters.

The blending device 10 includes a blender base 11. The blender base 11 may be any appropriate size and shape, such as generally cylindrical or rectangular. The blender base 11 may house various components such as the motor, gearing, a fan, vents, and other components to facilitate rotational movement required for blending.

The motor may be equipped with at least one of a variable speed control, playback function, switch means, cooling system, enhanced airflow management, automatic turn off feature, and weight sensors. The motor may interface with and be generally controlled by a blender controller, such as a microcontroller or other appropriate controller. The blender controller may control blending device 10 parameters, such as motor speed, the blending time, and other various parameters to carry out the steps of a recipe. Further, the blender controller may be configured to interface with the memory 25 to carry out operations stored in the memory 25 or to send data to the memory 25 to be stored.

The blending device 10 may include a display 18 or read out device. The display 18 may be located at any appropriate position, such as on the blender base. For example, the display may comprise one or more light emitting diodes (LEDs), liquid crystal displays (LCDs), bistable displays such as electrophoretic displays (EPDs) such as E Ink, electronic dial gauges, and the like.

The blending device 10 may include various input components. The input components may include buttons, dials, toggles, switches, key pads, keys, touch screens, and the like. In an embodiment, a user may access information or blending programs stored on the memory 25 and initiate a blending program by interfacing with the display and using the input components.

The blending device 10 may include one or more sensors. The sensors may include any combination of suitable sensors, for example, sensors may be used for measuring weight, imbalance, temperature, airflow management, cooling efficiency, time, pressure, noise, viscosity, delivery of an object, level, presence of a blender container or other related objects, etc.

The blending device 10 may be capable of wireless communication. For example, as described below, the blending device 10 may include a wireless controller 20 integrated with the blending device 10 or may include a communication port or connection to receive a wireless controller 20. The wireless controller 20 may be configured to send and receive data over a wireless signal and to interface with other wireless devices.

The wireless controller 20 may include any appropriate components to facilitate wireless communication. For example, the wireless controller 20 may include a wireless communication module 23, such as a wireless receiver/transmitter chip. The wireless communication module 23 may be configured to interface with any appropriate wireless communication protocol, such as Bluetooth, Wi-Fi, ZigBee, cellular networks, or any other known wireless communication protocols.

The blending device 10 may include a processor 24. The processor 24 may be any appropriate microcontroller or similar device. The processor 24 may be located on the blending device 10 or specifically on the wireless controller 20. The processor 24 may be connected to and drive the wireless communication module 23.

The processor 24 and wireless communication module 23 may be in communication with the memory 25. The memory 25 may be located at any appropriate place, such as on the wireless controller 20 or on the blender device 10. The memory 25 may be any appropriate size and any type of known volatile or non-volatile memory, such as read only memory ("ROM"). In an embodiment, the memory may be an Electrically Erasable Programmable Read-Only-Memory ("EEPROM"). The memory 25 may be configured to receive and store data from the wireless communication module 23 and may allow the wireless communication module 23 to retrieve data stored thereon.

The wireless controller 20 may be directly integrated with the blending device 10. For example, the wireless controller 20 may be located within the blender base and in direct communication with the blender controller.

In an embodiment, the wireless controller 20 may interface with the blending device 10 and blender controller by way of a communication port. For example, the wireless controller 20 may comprise a dongle 12 or other interfacing device. The dongle 12 may be configured to engage the communication port. The communication port may be a USB port, or any other appropriate type of communication port capable of interfacing with the dongle 12. The communication port may be configured to provide power and communication connections to the dongle 12. The dongle 12 may be connected to the blending device 10 to download information from the memory 25 and provide wireless communication between the blender controller and other wireless devices.

The dongle 12 and communication port may be located at any appropriate location. For example, the blender base 11 may include a communication port at any given location, such as on a bottom side of the base 11, on a side of the base 11, on the front of the base 11, or at any other position on the base 11, as illustrated in FIGS. 4-9.

The blending device 10 may include a memory port. The memory port may be configured to communicate with a memory device, such as an SD memory card, USB memory device, or other known memory device. The memory port may interface with the blender controller to provide programs and other system information and settings to the blending device 10.

The blending device 10 may be configured to communicate wirelessly with another wireless device 30, such as a smartphone, computer, tablet, personal computer, NFC point, or other wireless device. The wireless device 30 may be capable of sending or receiving data, such as a blender program, recipe data or system settings, to the blending device 10 by way of the wireless controller 20.

In an embodiment, the wireless device 30 may be capable of downloading and running a software application. The software application may be capable of connecting to a network, such as the Internet. The software application may be capable of accessing step by step recipes or blending programs from a remote database or website, such as www.vitamix.com, and downloading the recipes or programs to the wireless device. One example of communicating the recipe, or other information, from the wireless device 30 to the blending device 10 is through near field communication. For instance, data can be exchanged (e.g., recipes) between the wireless device 30 and the blending device 10 when they are brought into a predefined close proximity of each other. The wireless device 30 may then communicate the recipe information to the blending device 10 by way of the wireless controller 20. The blender display can then display the recipe information to a consumer in a step by step format so that the consumer can easily follow the recipe instructions while using the blending device 10.

In an embodiment illustrated in FIG. 1, the wireless controller 20 may be configured to pair with the wireless device 30 to communicate solely with that device. For example, the wireless controller 20 may be inserted into the communication port and may power up. The wireless controller 20 may then wait until it is paired with another wireless device 30, such as through a Bluetooth pairing, to proceed with interfacing with the wireless device. The wireless device 30 may initiate a pairing request to pair with the wireless controller 20. Once the wireless device 30 is paired with the wireless controller 20 it may send data to the wireless controller. The data may then be stored in the memory 25. The data may further be transferred to the blending device 10 through the communication port to be used by the blending device.

In an embodiment, the blending device 10 may be capable of wirelessly communicating with one or more other blending devices 10 having wireless communication capabilities to form a wireless blender network. For example, a first blending device 10 with a wireless controller 20 may be configured to communicate with a wireless controller 20 on a second blending device 10. The first and second wireless blending devices 10 may transfer and share information to optimize performance of the blending device 10 as a whole. For example, the blending devices 10 may share information related to temperature, number of blending cycles, blending cycle times, noise and vibration data, and other data collected from blender sensors. The data may then be used by one or more of the blending devices 10 to determine the optimal blending device 10 to be used. For example, the first and second blending devices 10 may determine which blending device 10 is the hottest blender in a group (most used) and which is the coldest blender in a group (least used) in order to optimize use of the group of blending devices 10 as a whole. It will be appreciated, however, that any parameters and data may be used when determining the optimal blending device 10 to be used.

In an embodiment, a blender network includes two or more blending devices 10. The blending devices 10 may be in communication with one another via wireless communication between their respective wireless controllers 30. Further, the blending devices 10 in the network may be in wireless connection with a database or server, for example by way of a Wi-Fi network signal. The database or server may receive blending data from the blenders, such as cycle times, cycle counts, temperature and other senor readings, noise and vibration sensing, and other parameters and data. The server may then calculate the optimal blender in the network to be used, based on any predetermined use guidelines, and send a signal to the network indicating the blending device 10 is in best condition for use. The blending device 10 that is to be used may then turn on an indicator such as a light or an icon or message, such as on the display. For example, the best blending device 10 to use may display a message of "available" on the display while the remaining blending devices 10 in the network display a message of "unavailable." Further, the blending devices 10 other than the available or optimal blending device 10 may be locked out from use based on a signal received from the server. The lockout feature may be optional or selectable by a user to force use of the optimal bending device 10. The server may further download use and programming instructions to blending devices 10 in the network.

In an embodiment, the blending device 10 may communicate with a wireless device such as a tablet to provide instructive blending to the blending device 10. The wireless device may transmit a recipe selected by the user to the blending device 10. By way of a non-limiting example, the wireless device may include an application or app, such as a recipe app, that the user may download and utilize from the wireless device. Using the wireless device, a user may indicate when each step of the recipe has been completed (e.g., the ingredients have been added to the blending container) or the blending device 10 may indicate through transmission of a wireless signal that a certain action by the user has been completed. Once the steps of the recipe have been confirmed, the wireless device may transmit the blend profile (e.g., the motor speed, duration, etc.) to the blending device 10. More specifically, the wireless device may provide instructions to a user to add certain ingredients into the blending device 10. The blending device 10 may sense the presence of the ingredients or the user may manually identify that he or she has added the ingredients. Instructions may be sent from the wireless device to start the blending device 10—the blending device 10 may alert a user to actuate the start actuator. Once the user starts the blending device 10, the wireless device may provide specific instructions to the blending device 10 according to the selected recipe. The blending device 10 may continue with the blending cycle until complete or until further action is required by the user. If further action is required of the user the blending device 10 or the wireless device may alert the user to take such action.

Although the present embodiments have been illustrated in the accompanying drawings and described in the foregoing detailed description, it is to be understood that the blending system is not to be limited to just the embodiments disclosed, but that the blending system described herein is capable of numerous rearrangements, modifications and substitutions.

What is claimed is:

1. A blending device comprising:
   a blender base comprising a housing, a motor having a drive shaft, at least one sensor, and a wireless controller disposed within the housing and operatively communicating via a wireless signal, and wherein the at least one sensor is disposed within or on the housing; and
   a container operatively coupled to the blender base, wherein the container is coupled with a blade assembly comprising a splined coupler that is operatively driven by the drive shaft, and
   wherein the at least one sensor measures a weight of an ingredient added to the container when the container is coupled to the blender base, and
   wherein the wireless controller operatively sends, receives, or sends and receives the wireless signal to or from a wireless device according to a communications protocol.

2. The blending device of claim 1, wherein the wireless device comprises at least one of a smartphone, computer, tablet computer, personal computer, or near field communication point.

3. The blending device of claim 1, wherein the wireless signal comprises data describing a blender program.

4. The blending device of claim 1, wherein the wireless signal comprises data describing a system setting of the blending device.

5. The blending device of claim 1, wherein the wireless signal comprises data describing a recipe.

6. The blending device of claim 1, wherein the blender base further comprises a display.

7. The blending device of claim 6, wherein the display, in response to the wireless controller receiving the wireless signal, updates displayed information based on data received from the wireless signal.

8. The blending device of claim 7, wherein the data comprises a recipe, and wherein the display displays information associated with the recipe.

9. The blending device of claim 1, wherein the wireless controller comprises a near field communications wireless controller.

10. The blending device of claim 9, wherein the wireless controller operatively detects whether the wireless device is within a coverage area of the near field communications wireless controller.

11. The blending device of claim 10, wherein the wireless controller communicates with the wireless device when the wireless device is within the coverage area.

12. A blending system comprising:
    a blending device comprising;
       a blender base, the blender base comprising a housing, a motor and a first wireless controller, wherein the motor is disposed within the housing, and the first wireless controller is disposed on or within the housing;
       a blade removably coupled to said motor;
       a container for receiving ingredients to be blended and operatively attachable to the blender base in at least one position; and
    a handheld wireless device comprising a second wireless controller, wherein the second wireless controller operatively communicates with the first wireless controller to receive real-time information from the blender base regarding ingredients received by the container, and
    wherein the handheld wireless device comprises at least one of a smartphone, tablet computer, or a near field communication point.

13. The blending system of claim 12, wherein the first wireless controller and the second wireless controller operatively communicate via a communications network.

14. The blending system of claim 13, wherein the communications network comprises at least one of the Internet, a Wi-Fi network, a Bluetooth network, or a near field communication network.

15. The blending device of claim 1, wherein the wireless controller comprises a Bluetooth device.

16. The blending device of claim 1, wherein the at least one sensor is positioned beneath the container when it is coupled to the blender base.

* * * * *